United States Patent [19]

Vogel et al.

[11] 4,211,768

[45] * Jul. 8, 1980

[54] DIETETIC FOODSTUFF AND ITS PRODUCTION

[75] Inventors: Roland Vogel; Heinrich J. Nikolaus; Peter Müller; Winfried Trinkaus, all of Darmstadt, Fed. Rep. of Germany

[73] Assignee: Merck Patent Gesellschaft mit beschrankter Haftung, Darmstadt, Fed. Rep. of Germany

[*] Notice: The portion of the term of this patent subsequent to Feb. 13, 1996, has been disclaimed.

[21] Appl. No.: 972,591

[22] Filed: Dec. 22, 1978

Related U.S. Application Data

[62] Division of Ser. No. 824,194, Aug. 12, 1977, Pat. No. 4,139,642.

[30] Foreign Application Priority Data

Aug. 20, 1976 [DE] Fed. Rep. of Germany ....... 2637426

[51] Int. Cl.² .................... A61K 35/12; A61K 35/56
[52] U.S. Cl. ........................................................ 424/95
[58] Field of Search ............................................. 424/95

[56] References Cited

PUBLICATIONS

Chem. Abst. -9th Collective Index, vol. 76-85 (1972-1976) p. 1113GS.

*Primary Examiner*—Douglas W. Robinson
*Attorney, Agent, or Firm*—Millen & White

[57] ABSTRACT

A method of suppressing appetite which comprises ingesting an amount of 20-60 grams effective to suppress appetite of a granulated dietetic foodstuff having a low rate of decomposition in the digestive tract consists essentially of a dried mixture of fat-free or low fat milk curds and casein in a dry solids ratio of about 1:1 to about 1:5, and having a particle size between about 0.5 and 5 mm, which is prepared by a process which comprises the steps of incorporating 2-5 parts of casein into 6 parts of moist milk curds; allowing the mixture to stand for a period of time sufficient to bind the excess water in the curds by swelling of the casein; whereby formation of a granulated and dried product is facilitated compared to milk curds alone.

6 Claims, No Drawings

DIETETIC FOODSTUFF AND ITS PRODUCTION

This is a division, of application Ser. No. 824,194 filed Aug. 12, 1977 now U.S. Pat. No. 4,139,642.

BACKGROUND OF THE INVENTION

This invention relates to a granular dietetic foodstuff, a process for its production and to its use as an appetite suppressant.

The production of a protein concentrate in granulate form from low fat or fat-free edible curds, as well as its use as dietetic foodstuff, is known. Such a granulate usually is produced from fresh curds, which are as low as possible in fats, by first mechanically removing a part of the whey and then granulating and drying. Numerous difficulties are involved in the production of such products. For example, it is not always possible to obtain a uniformly granular granulate. When the mass obtained after partial removal of the whey is too moist, it cannot be granulated since it is smeary or the granules stick together. If the material is too dry, it tends to crumble and too high a proportion of dust and fine granules is obtained after drying. Due to the variations in water content and the varying properties of the curds resulting therefrom, it is difficult to carry out a continuous and reproducible process for the production of the granulate since it is not possible to adjust the water content to constant values by mechanical processes.

It has now been found that a protein granulate suitable as a dietetic foodstuff can be produced in a technically simple manner in accordance with the process of this invention.

SUMMARY OF THE INVENTION

In a process aspect, this invention relates to a process for the production of a granulated dietetic foodstuff from moist low fat milk curds by incorporating 2 to 5 parts of casein into 6 parts of moist curds; maintaining the mixture until the casein swells; and granulating and drying the resultant mixture.

In a composition aspect, this invention relates to the granulated foodstuff thus produced, containing curds and casein in a dry solids ratio of from 1:1 to 1:5.

In a method of use aspect, this invention relates to the use of the granulated mixture of the fat-free or low fat curds and casein produced according to the process of this invention as dietetic foodstuff.

DETAILED DISCUSSION

The production process is significantly simplified by the process of this invention. Moreover, the granulated particles thus-obtained are especially compact and firm, with the result that the rate of decomposition in the digestive tract is lowered, resorption is slowed and the feeling of satiation is prolonged.

In carrying out the process of this invention, about 2 to 5, preferably about 2.5 to 3.5, parts of casein is kneaded into about 6 parts of fat-free or low fat moist milk curds, i.e., having a moisture content of between about 65 and 85%, preferably about 80%; allowing the casein to swell, e.g., for about 10 minutes to 3 hours; and then granulating and drying the swollen mixture. The granules obtained preferably have a particle size of about 0.5 to 5 mm. and a curds:casein ratio (dry solids) of about 1:1 to 1:5.

The casein is employed in its conventional dry, powdered form. Commercially available powdered casein has a moisture content of about 5 to 15%.

Low fat or fat-free curds are employed as starting material. As a rule, they are obtained with a water content of about 80%. The fat content of this moist curds normally is between 0 and 2%.

Surprisingly, the heretofore required pretreatment of the whey to effect a partial separation of residual whey from the curds is not necessary. On the contrary, especially advantageous production techniques are possible by using directly commercially available curds. Surprisingly, by kneading the casein in powder form into such moist curds, a product is obtained which is outstandingly suitable for granulating. Thus, on the one hand, the laborious separation of water from the starting curds is no longer necessary and, on the other hand, a mixture is obtained which is convertible into the granulate form in a superior manner than hitherto possible. Furthermore, there is obtained, in contradistinction to the previously known protein concentrate in granulate form, a superior dietetic foodstuff since the nutrients dissolved in the residual whey in the curds are retained in the granulate.

The casein can be incorporated into the starting moist curds in any desired manner. Kneaders are expediently employed. The resultant mixture is then allowed to stand to permit the casein to bind the excess water in the curds by swelling. The resultant swollen mass solidifies in such a manner that it can readily be granulated. As a general rule, the mixture is allowed to stand for about 10 minutes to three hours. If the swelling is completed in the kneader itself, the swollen mass is removed from the kneader and granulated in the known manner, e.g., employing a granulating roller.

The granulated mixture is then dried, e.g., in a fluidized bed drier, preferably first briefly at a temperature between 60° and 90° C., e.g., for about 10–30 minutes to a moisture content of about 15%, followed by a final drying, e.g., to a moisture content of about 6%, for a longer period of time at a lower temperature, e.g., between 30° and 70° C., for about 15 hours up to 2 days. Because of their low water content and of their dry surface which serves as a protective layer, the dried granules, when properly stored, have almost unlimited storage stability.

The milk curds and casein are present in the granulated and dried product in a dry solids weight ratio of about 1:1 to about 1:5, preferably about 1:2 to 1:3. The dried product has a moisture content of about 3–8%, preferably about 6%.

The granulate usually is obtained as cylinder-shaped particles whose length somewhat exceeds the diameter, e.g., particles with a diameter between 0.5 and 2 mm. and a length of about 1.5 to 5 mm., preferably about 2 mm.

In a preferred embodiment, the granulated curd and casein mixture, preferably after drageeing, is provided with a coating which optionally contains vitamins, mineral materials, trace elements and/or other physiologically active materials.

It is also possible to incorporate other active ingredients, especially vitamins, mineral materials and/or trace elements, together with the powdered casein, into the mixture of curds and casein prior to granulation. This method is preferred if desired to avoid the expensive and laborious drageeing of the granulated mixture.

The granulate can also be provided with any desired coatings for flavor improvement and to improve ease of consumption. This advantageously is achieved by drageeing in the usual manner with a coating of sugar or sugar substitutes or by other conventional methods, e.g., by spraying. As coatings for the granulate, there also can be used any conventional materials legally permitted for foodstuffs. If nutritional enrichment with vitamins, mineral materials, trace elements or other active materials or flavor improvement with aroma materials is desired, these can be incorporated into the coatings. A nutritionally physiologically especially advantageous coating is one which contains all of the essential vitamins. Alternatively or additionally, a drageeing mantle for the protection of the granules and to achieve a smooth surface to make consumption easier is preferred. If, in the production of the dragee mantle, instead of sugar there are used sugar substitutes, such as sorbitol, xylitol or mannitol, then other sweetening materials can also be added to increase the sweetening power. Generally, all drageeing coatings suitable for other foodstuffs or pharmaceutical compositions can be employed.

The protein concentrate obtained according to the process of this invention is an outstanding dietetic foodstuff. It ensures the dietetic need for the essential proteins since it contains all of the essential amino acids. If vitamins and/or mineral materials are incorporated therein, the need for these essential nutriments also is ensured. Due to the high protein content and the method of production, a long-lasting feeling of satiation is achieved as a result of the prolonged rate of digestion. For these reasons and because of its low physiological calorific value, the novel protein concentrate is especially suitable as a dietetic food in cases of overweight and/or adiposity.

The novel product is ingested in the same way as conventional curd granulates. The dosage as slimming food can be selected as desired, depending upon the protein content, since all component materials are physiologically useable and readily compatible. Conventionally, for a normal adult about 20 to 60 g. is ingested at one time, 1-3 times daily, e.g., stirred in water, fruit juice, milk or other cold beverage, or sprinkled on food.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

(a) 5 Parts of a moist, low fat (0.8%) milk curds with a water content of about 80% are introduced into a kneader. 3 Parts of casein in powder form are then introduced and well kneaded in. The mixture is allowed to stand for one hour, during which period the admixed casein absorbs water from the curds and swells. The swollen mass is removed from the kneader, granulated in a conventional manner and then dried, first for a period of 15 minutes at about 80° C., to a moisture content of about 15%, and then in a drum drier at about 60° C. for about 6 hours, to a moisture content of about 6%. A granulate is obtained in the form of cylinder-shaped granules having a diameter of about 1.8 mm. and a length of about 3 mm.

(b) 120 kg. of the thus-obtained granulate are moistened in a drageeing kettle with about 4 liters of drageeing syrup (DAB). Just before sticking, about 1 kg. beet sugar is sprinkled in and the mixture is blown dry. Thereafter, in five additions, each of 5 liters, a vitamin-containing drageeing syrup is added. The concentration of vitamins therein are such that about each 20 g. protein in the final product contains the following amounts of vitamins:

Vitamin A —1235 I.U.
Vitamin E —7.5 mg.
Vitamin $B_1$ —0.3 mg.
Vitamin $B_2$ —0.5 mg.
Vitamin $B_6$ —0.5 mg.
Vitamin $B_{12}$—1.3 µg.
Niacinamide —3.3 mg.
Calcium D-pantothenate 2.6 mg.
Folic Acid —0.1 mg.

After each addition, the granules are well mixed and dried. Subsequently, a layer is applied thereto by two additions, each of 3.2 liters syrup followed by about 1.3 kg. beet sugar sprinkled onto the granules.

For aromatization, if desired, about 80 g. vanillin are added in a third addition. The final granulate is then dried.

EXAMPLE 2

The granules are produced analogously to Example 1a, but employing about 13 kg. casein per 25 kg. curds (dry weight ratio of curds solids:casein about 1:2.6). There is obtained cylinder-shaped granules with relatively smooth surface and with a diameter of about 1.8 mm. and a length of about 2 to 4 mm.

Drageeing of the dried granules can be carried out analogously to Example 1b. However, if desired, the granules can also be used as such without coating.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of suppressing appetite in a patient in need of such treatment which comprises ingesting an amount of 20-60 grams effective to suppress appetite of a granulated dietetic foodstuff having a low rate of decomposition in the digestive tract consisting essentially of a dried mixture of fat-free or low fat milk curds and casein in a dry solids ratio of about 1:1 to about 1:5, and having a particle size between about 0.5 and 5 mm, which is prepared by a process which comprises the steps of incorporating 2-5 parts of casein into 6 parts of moist milk curds; allowing the mixture to stand for a period of time sufficient to bind the excess water in the curds by swelling of the casein; whereby formation of a granulated and dried product is facilitated compared to milk curds alone.

2. The method of claim 1, wherein in the process for preparing the granulated foodstuff, the starting curds have a moisture content of 65-85%.

3. The method of claim 1, wherein in the process for preparing the granulated foodstuff, the granulated mixture of curds and casein in a first step is partially dried to a moisture content of 12–20% and then further dried in a second step to a moisture content of 3–8%.

4. The method of claim 1, wherein the granules of the dietetic foodstuff are cylindrically shaped and have a particle size between about 0.5 and 5 mm.

5. The method of claim 1, wherein the granules of the dietetic foodstuff are cylindrically shaped and have a diameter between about 0.5 and 2 mm and a length of about 1.5 to 5 mm.

6. The method of claim 1, wherein the granules of the dietetic foodstuff are coated with a digestable protective coating.

* * * * *